United States Patent
Di Fabbrizio et al.

(10) Patent No.: US 7,174,481 B1
(45) Date of Patent: Feb. 6, 2007

(54) METHOD AND APPARATUS FOR A PROGRAMMING LANGUAGE HAVING FULLY UNDOABLE, TIMED REACTIVE INSTRUCTIONS

(75) Inventors: Giuseppe Di Fabbrizio, Summit, NJ (US); Nils Klarlund, Chatham, NJ (US)

(73) Assignee: AT&T Corp., New York, NY (US)

( * ) Notice: Subject to any disclaimer, the term of this patent is extended or adjusted under 35 U.S.C. 154(b) by 634 days.

(21) Appl. No.: 10/465,873

(22) Filed: Jun. 20, 2003

Related U.S. Application Data

(62) Division of application No. 10/188,893, filed on Jul. 5, 2002.

(60) Provisional application No. 60/303,274, filed on Jul. 5, 2001.

(51) Int. Cl.
*G06F 11/00* (2006.01)
(52) U.S. Cl. ..................................... 714/35
(58) Field of Classification Search ............... 714/35; 719/320
See application file for complete search history.

(56) References Cited

U.S. PATENT DOCUMENTS

| | | | | |
|---|---|---|---|---|
| 5,111,398 A | * | 5/1992 | Nunberg et al. | 704/9 |
| 5,479,601 A | * | 12/1995 | Matheny et al. | 715/700 |
| 5,481,710 A | * | 1/1996 | Keane et al. | 719/320 |
| 5,659,747 A | * | 8/1997 | Nakajima | 713/1 |
| 5,822,590 A | | 10/1998 | Gupta | |
| 6,014,657 A | | 1/2000 | Weida et al. | |
| 6,111,575 A | * | 8/2000 | Martinez et al. | 715/810 |
| 6,446,057 B1 | * | 9/2002 | Vaughan | 706/46 |
| 6,543,006 B1 | * | 4/2003 | Zundel et al. | 714/19 |
| 6,757,905 B1 | * | 6/2004 | Friedman et al. | 719/320 |
| 7,003,695 B2 | * | 2/2006 | Li | 714/19 |
| 2003/0105885 A1 | * | 6/2003 | McArdle | 709/320 |

OTHER PUBLICATIONS

G. Di Fabbrizio, et al.; "Extending a Standards-based IP and Computer Telephony Platform to Support Multi-modal Services", ESCA Workshop on Interactive Dialogue in Multimodal Systems, Kloster Irsec, Germany, Jun. 22-25, 1999; pp. 1-4; Florham Park, NJ, USA.

(Continued)

*Primary Examiner*—Michael Maskulinski

(57) ABSTRACT

A method and apparatus are described for providing an undoable programming language. More specifically, the present invention relates to providing a fully undoable programming language, where the language includes a fully undoable core language portion and a conventional language portion. An embodiment of the present invention includes a method of determining an actual target of an event calculating a set of pre-events of the event, adding the set of pre-events as children of the event, and the set of pre-events being set to be raised to a pre-queue of the event. The method also includes applying an event principle to each pre-event of the event such that a set of protected positions being augmented with an upward closure of the target, executing the event, if the actual target is defined and said event is consumable, and applying the event principle to each post-event of the event.

32 Claims, 4 Drawing Sheets

OTHER PUBLICATIONS

James E. Archer, Jr., et al.; "User Recovery and Reversal in Interactive Systems"; ACM Transactions on Programming Languages and Systems, Jan. 1984, pp. 1-19, vol. 6, No. 1, Cornell University, USA.

G. Di Fabbrizio, et al.; "Unifying Conversational Multimedia Interfaces For Accessing Network Services Across Communication Devices"; IEEE International Conference on Multimedia and Expo, New York City, New York, USA, Jul. 30-Aug. 2, 2000.

Jeff Ayars, et al.; "Synchronized Multimedia Integration Language (SMIL 2.0)"; W3C Recommendation Aug. 7, 2001; pp. 1-15; http://www.w3.org/TR/smil20/.

Arnaud Le Hors, et al.; "Document Object Model (DOM) Level 2 Core Specification"; W3C Recommendation Nov. 13, 2000; pp. 1-107; http://www.w3.org/TR/DOM-Level-2-Core/.

Linda Boyer, et al; "Voice eXtensible Markup Language (VoiceXML) Version 1.0"; W3C Note May 5, 2000, pp. 1-125; http://www.w3.org/tr/2000/NOTE-voicemxml-20000505.

A. Benveniste, et al.; "The Synchronous Approach to Reactive and Real-Time Systems"; Proceedings of the IEEE, vol. 79, No. 9, Sep. 1991; pp. 1270-1282.

International Telecommunication Union; "Specification and Description Language (SDL); Series Z: Languages and General Software Aspects for Telecommunication Systemss"; ITU-T Recommendation z.100, Nov. 1999.

James Clark, et al.; "XML Path Language (XPATH) version 1.0"; W3C Recommendation Nov. 16, 1999; pp. 1-35; http://www.w3org/TR/1999/REC-xpath-19991116.

Thierry Michel; "Synchronized Multimedia Activity Statement"; http://www.w3.org/AudioVideo/Activity.html.

Thierry Michel; "Synchronized Multimedia"; http://www.w3.org/AudioVideo/.

"The ESTEREL Language"; "Welcome to Esterel and Synchronous Reactive Programming!;" http://www-sop.inria.fr/meije/esterel/esterel-eng.html.

Stephen Edwards; "Synchronous Reactive Systems and the SR Domain"; http://www.eecs.berkeley.edu/~sedwards/.

* cited by examiner

METHOD AND APPARATUS FOR A PROGRAMMING LANGUAGE HAVING FULLY UNDOABLE, TIMED REACTIVE INSTRUCTIONS

CROSS-REFERENCE TO RELATED APPLICATIONS

This application is a divisional of and claims the benefit of and priority to U.S. Non-provisional patent application Ser. No. 10/188,893, filed Jul. 5, 2002, which claims the benefit of and priority to U.S. Provisional Patent Application Ser. No. 60/303,274, filed Jul. 5, 2001, which are incorporated herein in their entireties by reference thereto. This application is related to co-pending U.S. Non-provisional patent application Ser. No. 10/465,884, filed on Jun. 20, 2003, which is a Continuation-In-Part (CIP) of U.S. Non-provisional patent application Ser. No. 10/188,893, filed Jul. 5, 2002.

TECHNICAL FIELD

The present invention relates to a programming language with fully undoable, timed reactive instructions. More specifically, the present invention relates to enabling programs written in the programming language to fully recover to any previous program execution state.

BACKGROUND OF THE INVENTION

In computer science, the notion of recovery is fundamental to many areas: in database systems, transactions can be undone until they are "committed"; in applications, such as browsers and word processing applications, a button (or key combination) will undo recent actions; and in programming languages such as Interlisp, certain, but not all, operations may be available in a reversible form so that they can be undone through a built-in mechanism.

Generally, programs, as well as interactive systems, change the state of a system step-by-step. When a user of an interactive system discovers that a recent action was misinterpreted, or maybe mistakenly issued, it is useful if a single command can restore the state of the system to one that occurred before the erroneous action. Unfortunately, programming such a command is not an easy task using conventional programming languages, since the programmer must explicitly keep track of previous system states.

Therefore, it has been suggested to augment programming languages with constructs that enable the selective recovery of previous states. For example, Interlisp offers undoable versions of assignment statements that not only change the value of a variable in the conventional sense, but also preserves the previous value. When recovery is needed, the Interlisp language offers primitives that restore previous values of variables. Unfortunately, the recovery is partial, since it only works for variables that were modified exclusively through the undoable versions of operations.

It has also been suggested to build-in support for the undoability of all file related operations. The Cooperative Programming Environment (COPE) system (see, James E. Archer, Jr., Richard Conway, and Fred B. Schneider; "User recovery and reversal in interactive systems," ACM transactions on programming languages and systems, vol. 6, no. 1, January 1984) uses this approach for a uniform method of undoability. Changes in the COPE system are reflected in file changes, which are recorded and tracked. In particular, user interactions in a text editor all become undoable if the changes are committed to files. This approach, however, does not directly tie-in with the need for recovery of states expressed in the programming language that controls the more sophisticated user interfaces, such as those involving multimedia.

A more common approach to solving the issue of recovery in interactive systems is through the use of command encapsulation. Commands that are to be undone are equipped with a standardized interface, for example through the object-oriented technique of derivation, and these commands are invoked through a centralized component that keeps track on the sequence of commands executed. This method is described in "Design Patterns, Elements of Reusable Object-Oriented Software" by Erich Gamma, Richard Helm, Ralph Johnson, and John Vlissides, Addison Wesley Professional Computing Series, p. 233. The command interface also allows for the specific formulation of the undo operation that can be invoked by the centralized component in case a previous state needs to be restored through the retraction of already executed commands. Moreover, it is natural to encapsulate state information with each instance of an executed command. In this way, important state information, chosen by the programmer, can be recovered by the centralized component when already executed commands are undone. One elaboration on this idea may be found in U.S. Pat. No. 5,481,710, Method of and System for Providing Application Programs Within Undo/Redo Function.

SUMMARY OF THE INVENTION

In general, the invention includes a method and apparatus for providing a programming language, in which programs may be written to enable a program to fully recover to any previous execution state. An embodiment of the present invention includes a method of determining an actual target of an event calculating a set of pre-events of the event, adding the set of pre-events as children of the event, and the set of pre-events being set to be raised to a pre-queue of the event. The method also includes applying an event principle to each pre-event of the event such that a set of protected positions being augmented with an upward closure of the target, executing the event, if the actual target is defined and said event is consumable, and applying the event principle to each post-event of the event.

DETAILED DESCRIPTION

Figure 1:
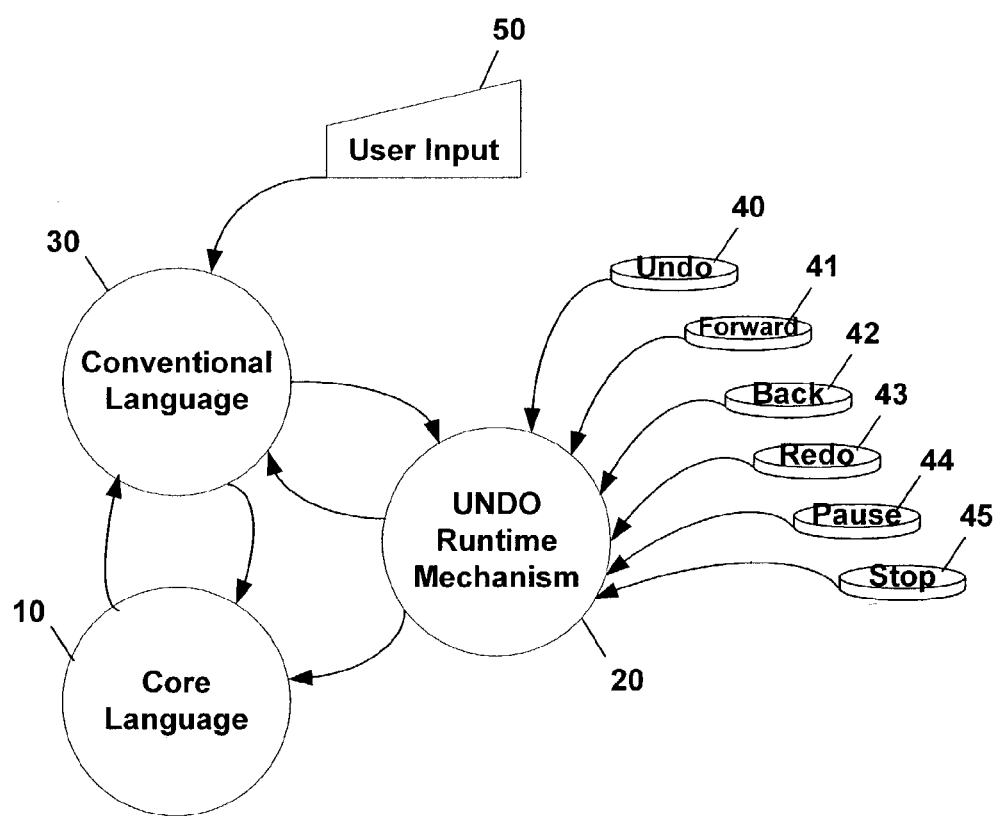
FIG. 1 is a top-level system diagram of computer system for generating and executing fully undoable programming language applications, in accordance with an embodiment of the present invention.

In accordance with an embodiment of the present invention, an undo capability in user interfaces may be tied to an expression in a programming language that is specifically designed to support state recovery. Specifically, the programming language used to describe the user interface may be partitioned into two parts, for example: a core language, where as a default, every operation may be undoable, redoable and seekable; and a conventional language, in which operations are not undoable. In general, the undoable core language must be simpler than conventional scripting languages that support pointer operations and object-orientation, since otherwise, runtime performance would be severely impacted by the standard bookkeeping techniques, such as check-pointing and inverse command strategies, which are necessary for reverting states. See, for example, James E. Archer, Jr., Richard Conway, and Fred B. Schneider: "User recovery and reversal in interactive systems," ACM transactions on programming languages and systems, vol. 6, no. 1, January 1984.

Moreover, for the programming of sophisticated user interfaces, such as those involving multimedia or multi-modal input (such as, keyboard, voice, mouse, etc.), a reactive or concurrent programming paradigm may be needed to express the concurrent activities inherent in such interfaces. Programming languages in this category, in general, may incorporate the notion of concurrent or parallel activity as a basic primitive.

In accordance with an embodiment of the present invention, when the programming language is otherwise sufficiently simplified, a core language may support both concurrency and a full recovery mechanism. Specifically, the core language may be an imperative programming language that exposes no pointer types either directly or indirectly through object-orientation. Instead, the values manipulated by the language may be text strings, Boolean values, enumeration types, tuples of values, or more generally, values arranged in trees, such as expressed in eXtensible Mark-up Language (XML) or s-expressions in Lisp. Values may be formed from other values through an expression language that expresses string and tree manipulations, such as concatenation and/or term construction.

In accordance with an embodiment of the present invention, the expression language and value system may use XML trees and/or tree fragments together with the XPATH expression language [XPATH]. See, for example, XML Path Language (XPath) Version 1.0, W3C Recommendation, 16 Nov. 1999, http://www.w3.org/TR/xpath.

To this foundation of values and expressions, conventional programming language mechanisms for declaring variables and for assigning values to the variables may be added. Similarly, conventional control structures, such as conditional and repetitive constructs also may be added.

Finally, well-known concurrency primitives may be added to declare and execute threads, each of which may be an independent process. Primitives that allow threads to be recursively broken down into subthreads, which is analogous to, for example, the task primitive of the Ada programming language. An event system for communication, which may be synchronous and/or asynchronous, may be added. Such an event system may include handlers for external events, such as user input, and perhaps ways of generating events (or signals or remote procedure calls) that may be used internally within the program for communicating with external modules (such as those describing the layout of a visual interface all those that process input such as speech).

FIG. 1 is a top-level system diagram of computer system for generating and executing fully undoable programming language applications, in accordance with an embodiment of the present invention. In FIG. 1, a core language 10 may be in two-way communication with both an undo-runtime mechanism 20 and a conventional language 30. Similarly, conventional language 30 may be in two-way communication with undo-runtime mechanism 20. Both conventional language 30 and undo-runtime mechanism 20 may be configured to receive user commands from a variety of different multimedia or multi-modal input sources. For example, the variety of different multimedia or multi-modal input sources may include an "undo" button 40 coupled to undo runtime mechanism 20 to return to a prior program execution state. Undo button 40 may be defined to be a predetermined keystroke or combination of keystrokes on a keyboard and/or an on-screen button enabled to be selected by a user, for example, by highlighting the button and single clicking with a mouse. Similarly, a "forward" button 41 to enable moving forward (seeking forward), a "back" button 42 to enable moving backward (seeking backward), a "redo" button 43 to "undo" an undo command, a "pause" button 44 to temporarily suspend execution, and a "stop" button 45 to terminate the execution of the application may each be coupled to undo runtime mechanism 20. A user input 50, for example, a speech input component may be coupled to conventional language portion 30 and may be used to input voice commands to perform each of the above button functions.

In FIG. 1, core language 10 may implement the semantics of the core language in a plurality of fully undoable, timed reactive instructions. In particular fully undoable core language 10 may define a global state that determines the values of all program variables of the program in the core language and the positions of all program counters of the program. Similarly, undo-runtime mechanism 20 may be associated with and supervise the execution of the plurality of fully undoable, timed reactive instructions of core language 10. In particular, undo-runtime mechanism 20 may maintain information about previous global states according to any number of well-known techniques, for example, full checkpointing, which simply records the totality of state information at various points of time during program execution. Likewise, if necessary, conventional language 30 may have its own runtime system (not shown).

Fully undoable core language 10 may issue procedure calls using expressions written in conventional language 30. Each such procedure call may be equipped with both a "do"-specification that expresses the action to be taken and an "undo"-specification that expresses how the action may be undone. Both specifications may be expressed in terms of conventional language 30. Undo-runtime mechanism 20 may keep track of the history of calls to the conventional language component so that they can be undone. Similarly, conventional language 30 also may be able to call functions or be able to produce events in core language 10 through a call-back like mechanism. In general, conventional user input may be bound to the functionality expressed in conventional language 30. Thus, user input may be routed to core language 10 through conventional language 30. Alternatively, core language 10 may directly specify functionality pertaining to user input. If so, undo-runtime mechanism 20 may be invoked in response to the user input including, for example, a direct selection of undo button 40 in undo-runtime mechanism 20, by a call from conventional language 30, or perhaps as a result of a spoken command through user input 50. In any case, when undo-runtime mechanism 20 is invoked, undo-runtime mechanism 20 may roll back the global state of core language 10 to a prior global state stored in undo-runtime mechanism 20. Undo-runtime mechanism 20 may also issue calls to the procedures of undo-specifications corresponding to the history of calls to conventional language 30 in order to restore, at least partially, the state of the conventional language runtime system, as requested by a programmer.

Figure 2:
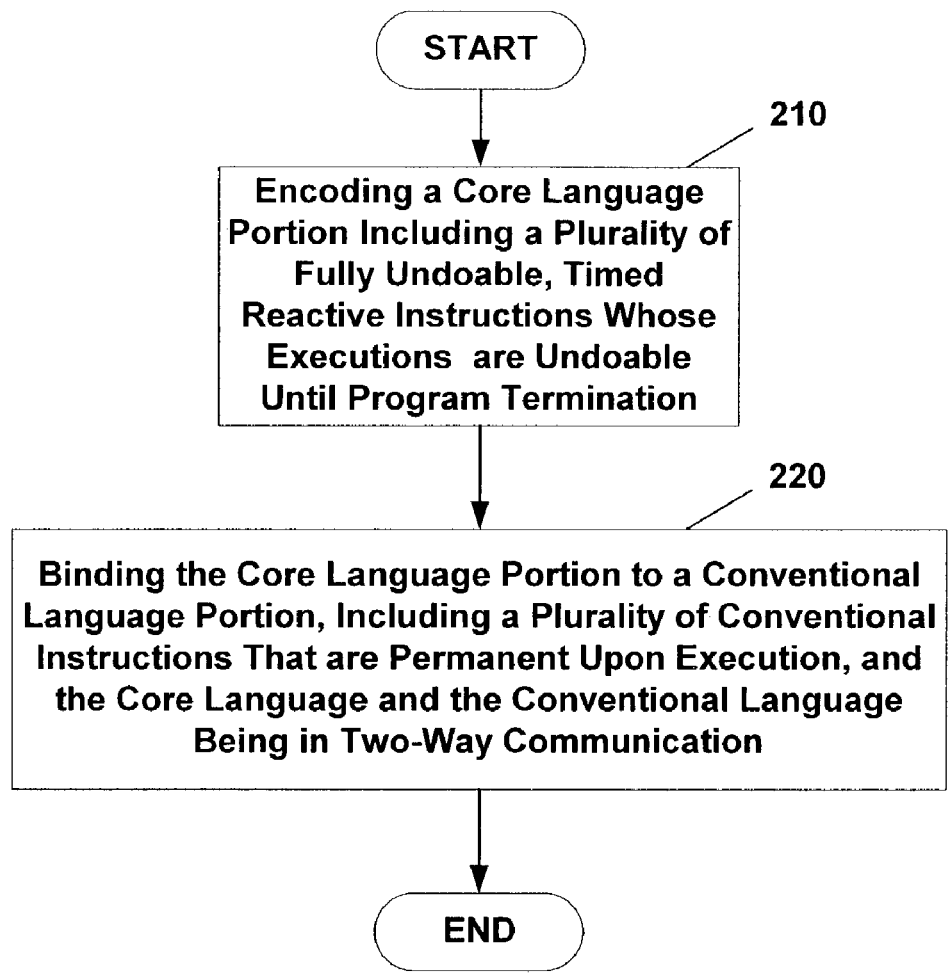
FIG. 2 is a top-level flow diagram of a method of constructing a programming language to enable fully undoable, time reactive instructions, in accordance with an embodiment of the present invention.

FIG. 2 is a top-level flow diagram of a method for encoding a programming language to enable fully undoable, timed reactive instructions, in accordance with an embodiment of the present invention. In FIG. 2, a core programming language portion may be encoded (210) to include a plurality of fully undoable, timed reactive instructions whose executions may be fully undone up until termination of a program written in the core programming language, or until a predefined resource bound is reached. In general, the core programming language may be core language 10 from FIG. 1, and which may be represented by a syntax that enables the generation of a plurality of fully undoable timed, reactive instructions. Returning to FIG. 2, core language 10 may also generate undo runtime component 20, which may be used to store previous global program execution states from core language 10 to enable the complete undoing of executed core language instructions and return to program execution to an earlier global program state upon receipt of an undo instruction.

In FIG. 2, core language 10 may be bound (220) to conventional language portion 30. Conventional language 30 may be represented by a conventional programming language syntax that may enable the generation of a plurality of conventional instructions and may permit two-way communication with core language portion 10.

Figure 3:
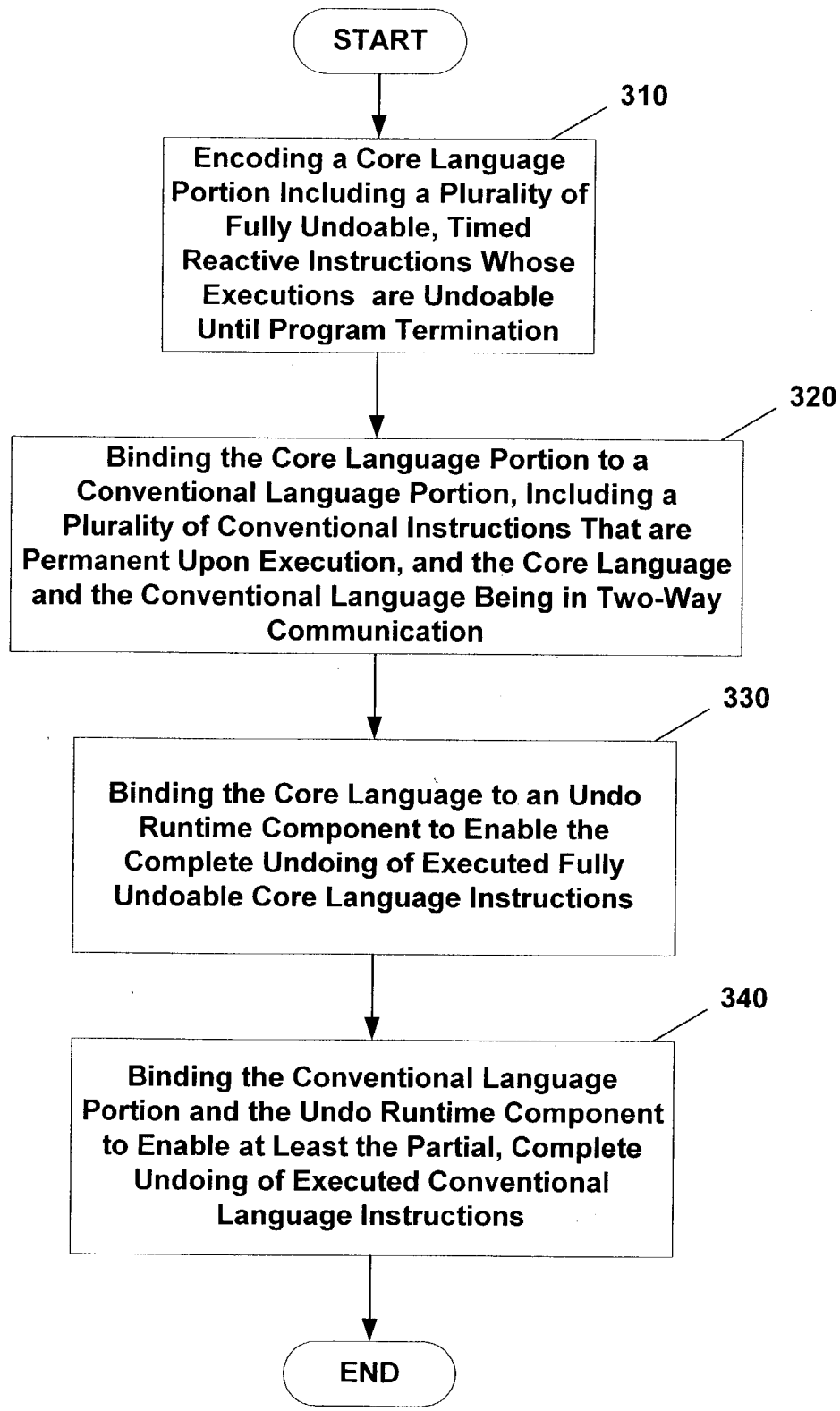
FIG. 3 is a top-level flow diagram of an alternate method of constructing a programming language to enable fully undoable, time reactive instructions, in accordance with an embodiment of the present invention.

FIG. 3 is a top-level flow diagram of an alternate method for encoding a programming language to enable fully undoable, timed reactive instructions, in accordance with an embodiment of the present invention. In FIG. 3, a core programming language portion may be encoded (310) to include a plurality of fully undoable, timed reactive instructions whose executions may be fully undone up until termination of a program written in the core language. In general, the core programming language portion may be core language 10 of FIG. 1, and which may be represented by a syntax that enables the generation of a plurality of fully undoable instructions. Returning to FIG. 3, core language 10 may also generate undo runtime component 20, which may be used to store previous global program execution states from core language 10 to enable the complete undoing of executed core language instructions and return to an earlier global program execution state upon receipt of an undo instruction.

In FIG. 3, core language 10 may be bound (320) to conventional language portion 30. Conventional language 30 may be represented by a conventional programming language syntax that may enable the generation of a plurality of conventional instructions and may permit two-way communication with core language portion 10.

In FIG. 3, core language 10 may also be bound (330) to undo runtime component 20 to enable the complete undoing of executed core language instructions. Undo runtime component 20 may be bound (340) to conventional programming language 30 to enable two-way communication between the two and to enable at least partial undoing of executed conventional language instructions.

In accordance with an embodiment of the present invention, in general, functioning of the core language may be to react to external events such as, external programs, mouse clicks, keyboard keystrokes or speech recognition results. The reaction may consist of the execution of the program according to its semantics. This typically means that the thread handling the external event may be awoken. Upon awakening, the external event handling thread may send events internally to other threads, which also may be executed, and as a result program counters of threads may change the values and variables may be updated and events to external modules may be generated. A thread may go into a dormant state when its program counter arrives at a communication primitive that expects an event (such as a handler or a select statement indicator).

Many more conventional programming language concepts may be added, for example, subroutines. But generally speaking, the core language may not encourage the use of loop structures or recursion. In this way, the typical result of an external event may be that one or more processes execute pieces of straight line code.

In accordance with an embodiment of the present invention, the core language may support full checkpointing; that is, a global state of the core language may be saved to a memory at each checkpoint in a program. For example, the global state at the checkpoint may be saved to undo runtime-mechanism 20. Naturally, partial checkpointing may also be used to store only those parts of the System State that are necessary. Checkpoints may be declared in a number of ways: for example, certain types of events may be defined to be associated with a checkpoint operation, or checkpoint operations may be explicitly identified in the program text by, for example, a checkpoint marker construct.

The program may revert to a system state of a previous checkpoint through well-known recovery mechanisms, such as, for example, special undo and redo operations, which may be invoked, either from within the program, or through some exterior means, for example, an undo button, to recover a previous global state. Known results about the characteristics of undo mechanisms, for example, that there are at least two fundamentally different kinds of undo operators, specifically, one that records the undo operation and one that does not. Likewise, a redo operation may be defined to undo the effects of an undo operation.

In certain circumstances, such as, for example, when a code fragment expressed in the core language has instructed an external component to carry out a database transaction, it is important that the code fragment is never undone. To reflect this need, the differences between local states of threads (a concept that covers the values of all program counters and variables declared by the thread (and its subthreads)) and the global state (the collection of all local states) are distinguished. Therefore, there may be primitives in the language to locally prevent recovery, that is, the local protect primitive prevents a thread from being recovered to a point before a local protect primitive was executed. As a result, the recovery may not necessarily re-establish a previous state. Threads that have executed a local protect primitive since the time of the state that is being reverted to by a recovery operation may only be brought back to the first local state following the last execution of a local protect primitive. Similarly, there may be a global protect primitive, which when executed, may prevent recovery of any thread to an earlier time.

As mentioned, the core language may be augmented with a conventional language, which does not support automated recovery. To connect the core language with the conventional language, the function and/or method calls to core language procedures may be expressed in the conventional language. For example, a program in the core language may handle an event containing a credit card number inputted by the user. The core language program fragment may invoke a procedure in the conventional language to carry out the validity checks on the number necessary to certify that it is a correct credit card number. Further execution of the core language fragment will depend on the result returned by the conventional language. In general, none of the states involved in the execution of the conventional language are recorded. However, in certain cases, external programs may maintain states that must be synchronized with the core language program. In particular, the external program must be notified if executions are undone in the core language program. A possible mechanism may be to associate notification events to external procedure calls. These notification events may be generated only when execution is recovered that involved the corresponding calls. The notification events may be sent to the external program.

Figure 4:
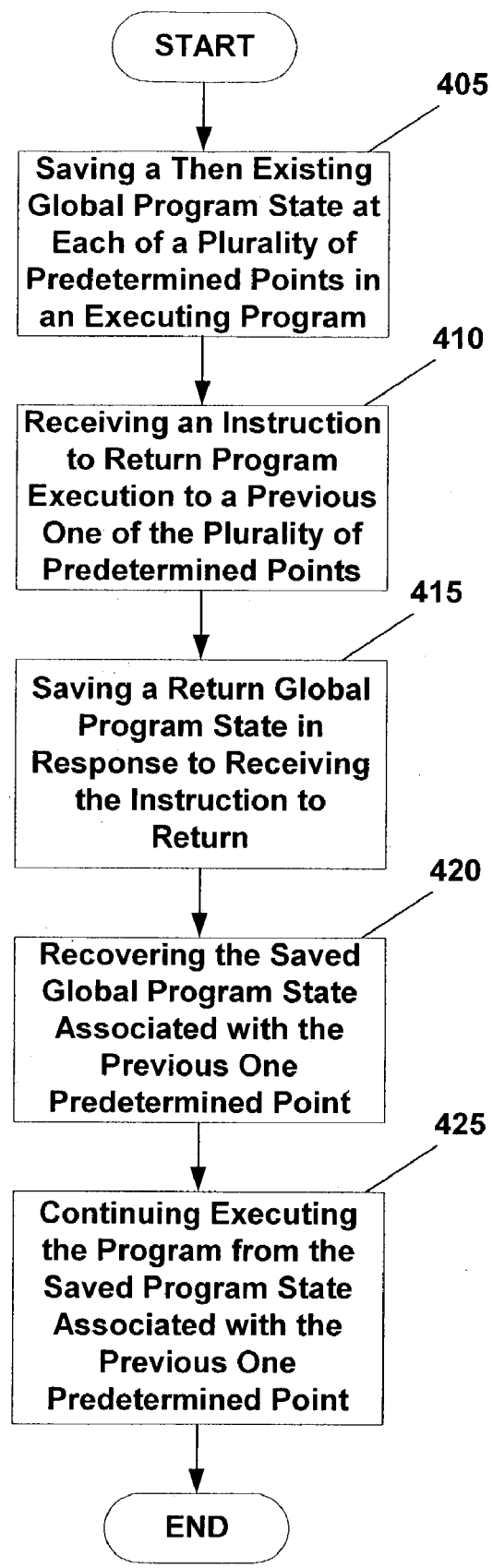
FIG. 4 is a top-level flow diagram of a method of executing an undoable program written in a programming language having fully undoable, time reactive instructions, in accordance with an embodiment of the present invention.

FIG. 4 is a top-level flow diagram of a method of executing an undoable program written in a programming language having fully undoable, time reactive instructions, in accordance with an embodiment of the present invention.

In FIG. 4, in accordance with an embodiment of the present invention, a then existing global program state at each of a number of predetermined points may be saved (405), for example, to a memory, during the execution of a program. At some later point in the execution of the program, an instruction to return to a previous one of the number of predetermined points, for example, an undo instruction, may be received (410). In response to receiving (410) the instruction to return, a return global program execution state may be saved (415) to the memory. The method may then recover (420) the saved global program execution state associated with the previous one predetermined point. The method may also continue executing (425) the program from the recovered saved global program execution state associated with the previous one predetermined point.

Saving (415) the return global program state enables the receipt of a "redo" instruction to cause the program execution to, similar to the above-described method, return to and continue from the saved return global program execution state.

In accordance with an embodiment of the present invention, a fully undoable programming language may be implemented as a simple, thread-based scripting language for multimedia and telephony user interface programming. Specifically, core language portion 10 from FIG. 1 may be shown as a model for how to simplify and consolidate user interface programming techniques expressed in, for example, Synchronous Multimedia Interface Language (SMIL) 2.0, VoiceXML and Dynamic HTML. In accordance with an embodiment of the present invention, a fully undoable programming language (UPL) borrows as much as possible from the general XML programming notations, XPath 2.0 and XSLT 2.0. In particular, UPL may provide a precise framework for understanding and generalizing SMIL. Unfortunately, SMIL has an incomplete and complicated semantics that does not address the fundamental issue of maintaining program state information when moving backward or forward in time when using the seek and undo mechanisms. In contrast, UPL may provide precise semantics, along with a workable undo and seek mechanism. Consequently, embodiments of the present invention may provide usable mechanisms for recovery of previous computational states, for example, undo, redo, fast forward and fast backward functionality, which may be implemented using a keyboard keystroke sequence, an on-screen button or voice-activated commands. Some of the main features of embodiments of the present invention may include:

values may be simple values or documents, which means that no overhead for an object model is required;

events, event notifications, and exceptions may be variations of one mechanism;

event notifications, referred to as co-events, may be declared statically as co-event handlers, which may provide deterministic explanations of event observations expressed as events;

co-events may execute prior to or subsequent to the execution of the observed event;

event values may be documents, thus allowing event handlers to use matching as in XSLT;

expressions and constructors may be the same as those in XPath and XSLT;

temporal mechanisms of SMIL real-time programming, which allow easy real-time programming and synchronization among streams;

an undo mechanism that mends the time seek functionality of SMIL and automatically makes user interfaces implement a consistent undo facility, which may be crucial to the usability of speech recognition interfaces; and semantics that may be simple, completely specified and deterministic.

Overall Structure and Namespace. An UPL program may be an XML document of the form:

<UPL     xmins="www.UPL.org/v1.0"     xmins: UPL="www.UPL.org/v1.0">
Declarations Statements
</UPL>

In general, UPL works with the syntactic categories of Declarations, Statements, Expressions, and Constructors. Above, a default namespace has been declared and the prefix UPL has been introduced. In general, events belong to namespaces that are application dependent. In accordance with XML customs, the syntactic category Name may be defined as in Tim Bray, Jean Paoli, C. M. Sperberg-McQueen, and Eve Maler Extensible Markup Language (XML) 1.0 (Second Edition)W3C, 2000, http://www.w3.org/TR/REC-xml, with colons being disallowed. This category may be used for names of variables, which may be scoped. For identifiers that must be defined in at most one place, the category ID may be used.

Expressions. In accordance with the present embodiment, all value manipulation may be based on the XML Path Language (XPath), where a XPath expression may be evaluated with respect to a context item and a context document. In general, the item may be a node in the document.

For simplicity, several conventions used in the draft XPath Version 2.0 standard are used herein to describe the present invention. Thus the syntactic category expression, abbreviated expr, may be that of XPath. In XPath an expression may return a value that is either a simple data type, for example, a Boolean or a string; or a document node, for example, an XML tree. By default, the type exception policy may be strict, for example, an exception raised by the evaluation of an expression is converted into a UPL event <UPL:error type="XPath"/>raised at the place of the expression.

Static context. In accordance with an embodiment of the present invention, an XPath expression may be evaluated with respect to a static context, which may define the value of declared variables and exception policy. In contrast to XSLT, UPL may use imperative variables, which may be referenced in the same way according to conventional mechanisms of static scoping.

Dynamic context. In accordance with an embodiment of the present invention, a dynamic context may specify the focus of the expression, that is, the information that specifies which nodes are to be processed by the expression. An XPath expression is evaluated with respect to a context item and a context document. As a default in UPL, the context document may be the event tree and the context node may be that of the selected event.

Boolean Expressions. In accordance with an embodiment of the present invention, a Boolean expression, for example, bool-Expr may be a new XPath expression type that may evaluate to a Boolean value, which may be either true or false.

Time-track Expressions. In accordance with an embodiment of the present invention, a time-track expression, for example, track-Expr may be a new XPath expression type that may evaluate to "start", "pause", "resume", "seek" or "stop".

Location expressions. In accordance with an embodiment of the present invention, a location expression, for example, loc-Expr may be an XPath expression that may be evaluated statically in a context that consists of the program itself with the context node being the element node that has the attribute node where the expression is contained. The value of the location expression may be a set of nodes in the program.

Floating point expressions. In accordance with an embodiment of the present invention, a floating point expression, for example, float-Expr may express a real number. Floating point expressions may only be used for time designations. By default, the unit used is seconds.

Constructors. In accordance with an embodiment of the present invention, as in the current XLST 2.0 proposal, and similar to the result tree fragments in XLST 1.0, an XML tree constructor Constr may express XML trees that may be put together from static parts, using, for example, XML syntax, and dynamic parts using, for example, XPath expressions. For example, the following expression:

```
<asr:grammar>
    <asr:rule name="S" weight="{$w}">
        <UPL:value-of select="$t"/>
        <UPL:copy-of select="$prd"/>
    </asr:rule>
</asr:grammar>
``` may create a document. Specifically, if the previous general expression is evaluated in a context where the variable w has value "0.5", the variable t has value "help", and the variable prd has the value "<asr:optional>me</asr:optional>", the expression may be rewritten as:

```
<asr:grammar>
    <asr:rule name="S" weight="0.5">
        help
        <asr:optional>me</asr:optional>
    </asr:rule>
</asr:grammar>
```

Events. In accordance with an embodiment of the present invention, events may enjoy properties that allow them to take on functions found in a variety of programming languages. For example, events may act as exceptions, signals and asynchronous messages. Events may be raised either by the UPL program itself, by the raise statement or by the environment as an external event. An event may be an XML document and there may be three classes of events:

ordinary events, which are raised explicitly or by the environment;

co-events, which are raised by the UPL program as a consequence of an event observation; and execution events, which are raised by the UPL program to signal events that relate to progress of the program counter or to errors.

In accordance with an embodiment of the present invention, events may be either consumable or non-consumable. A consumable event may be handled if possible, but a non-consumable event, called a signal, in general, is never handled.

In accordance with an embodiment of the present invention, events may be either raised exactly on the target location specified or are forwarded to the location of the program counter in the thread of the target location.

In accordance with an embodiment of the present invention, events may also have an associated immediate property. Normally, an event that is raised may usually be appended to the end of the post-event queue. However, if the event has the immediate property, then it may be appended to the front of the queue.

Likewise, In accordance with an embodiment of the present invention, an event may also have a delay property. For example, a co-event may normally be raised before the observed event. However, if the delay property is specified in the handler for the co-event, then the co-event may be raised after the observed event.

In accordance with an embodiment of the present invention, an event may further have an associated bubbling property, which may automatically raise the event to the next enclosing thread. However, a cancel statement may prevent the bubbling of the event from occurring.

Execution events. In accordance with an embodiment of the present invention, a thread may be suspended whenever it enters or exits a block, for example, at the same time an init or exit, respectively, may be signaled on the block as an immediate event. Consequently, the thread may be restarted if a co-handler, for example, an on-init handler, exists for such a signal. The <terminate/> statement does not raise an event. But, termination is usually accomplished through the raising of the exit signal to a block, which by default may propagate to all blocks in all handlers, and by transitivity, to all enclosed blocks.

Execution model. In accordance with an embodiment of the present invention, UPL may be a reactive programming language in which the statement syntax may be formulated in XML. Therefore, the syntax may provide a convenient abstract tree for the definition of scopes and program counters.

For example, In accordance with an embodiment of the present invention, the basic element, which may be called a handler, may be an event-initiated sequence of statements that may all execute in a single thread. An event expression of a handler may characterize the events that the handler may catch. For example, a thread may be a handler of a thread block or it may be the main thread of the program. Each thread of a thread block may be called a subthread of a thread containing the block. Therefore, all threads may be known statically and a thread may execute exactly one statement at a time, in sequence. The threads may be structured through the mechanism of a state block, whose handlers are called states and define an event-driven state-machine. Both kinds of blocks may contain local variable declarations, thus, blocks may delineate scope in the usual way.

In accordance with an embodiment of the present invention, each element in a program may be annotated with an id attribute, which may be regarded as a label, and may be used to identify a position in the program. For example, given positions l and l', l may be within l' if the node indicated by l is a descendent of the node indicated by l'. In particular, l may be within l' if l=l'. The upward closure of a position l may consist of all the state blocks l' that contain l and that are in the same thread as l.

During a reaction, a set of protected positions may prevent the execution of a handler, and/or code that contains a handler, when the handler has already been selected for execution for an event e, but is not yet executing due to intervening pre-events. However, none of the intervening pre-events may be allowed to prevent the handler from executing event e.

The execution status of a thread may be either executing, invalid, or waiting. At most one thread may execute at a time, and the progress of the execution may be reflected by the thread's program counter, which is either invalid, as is the thread itself, or an ID of an element contained in the thread, for example, the program counter, and the thread as well, is said to be valid. In general, execution may always be in response to an event. The execution of a thread may be considered to take almost no time, and it must consist of a finite number of executions of statements. Normally, the execution may last until the program counter reaches a block or co-block, upon which the thread may be suspended. Alternatively, the execution of a thread may lead to its termination, if the thread becomes invalid.

In accordance with an embodiment of the present invention, the program itself may be a thread block. The notion of execution status validity may extend to all handlers. Validity of an element means that the program counter of the element's thread may be defined and may be within it. A handler may be valid only if the block that contains it is valid. Any subset of the handlers of a thread block may be valid. But, at most one of the handlers of a state block may be valid. A block may be valid only if the handler that contains it is valid and the program counter of the thread containing the block is inside the block.

The global state may be defined as an account of the program counter of each thread and the value of each variable that is declared in a valid block.

The program may contain, by default, an empty handler that may match all events. The main thread of the program, in general, is always valid. An event that is not caught anywhere else may be caught by the default handler. As a result, such an event may have no effect on the global state.

In general, all threads are in a non-executing state and only an external event may initiate execution of a thread. An executing thread may in turn raise additional events, which lead to further executions of other threads. This process may be called the reaction to the external event. The reaction may terminate in finite time (unless the program is faulty, in which case either an infinite process of executions may lead to non-termination or some execution is infinite). The reaction as a whole may be regarded as taking very little time. Therefore, in between external events, in the present embodiment, the program may have enough time to complete the executions of the reactions.

In general, during the reaction, an event e may be subjected to several calculations. First, the intended target of the event may be defined as follows: if the event is not forwarded, then the intended target may be the same as the target but only if the program counter of the thread containing the target is at the target or inside the target; and if the latter condition is not satisfied, then the intended target is undefined. Otherwise, when the event is forwarded, the intended target is the location of the program counter of the thread containing the target (but if the program counter is not defined, the intended target is not defined).

In accordance with an embodiment of the present invention, from the intended target, the actual target may be calculated as follows. The innermost block l' containing l may be located. If l' is a protected program position (see below), then the actual target may be undefined. Note that potentially l=l'. The event expression of the first handler of l' may be evaluated with an XPath focus of e. If this expression evaluates to true, then the handler is the actual handler and l' is the actual target. Otherwise, the remaining handlers may be tested in sequence until an accepting handler is found. However, if no such handler is found, the same procedure may be repeated for the innermost enclosing block l'' that contains l' (and so on, recursively, but if any such block is a protected position, the actual target may be undefined). The actual target is now defined as the block or thread-block defining the accepting handler.

When the actual target l is defined, then the set of co-events may be calculated as consisting of all pairs (e,l), where l may be a co-handler that matches e. The co-events may be ordered in a sequence based on their locations, which, in general, may be ordered according to the document ordering of the program. Note that this definition may be independent of whether control may actually be at the co-handler; it is possible that it is not, but that the co-handler during the reaction will become enabled.

If the actual target is a state block and the program counter is inside a handler, l_h, of the block, then, in general, this handler must be terminated. This may be accomplished through an exit event (UPL:exit, l_h), which may be appended to the set of co-events. The location, l_h, may be added to the set of locked blocks.

An event e whose actual target is a block, l_b, may be executed as follows. For a state block, the program counter may be at the handler of the block. Generally, this will be the case thanks to the (UPL:exit, l_h) event and the fact that the position l_b, along with all blocks above it in the same thread, cannot execute since they are protected during the processing of the pre-events of e. Otherwise, the program counter may be at the block itself, and may now be changed to be at the handler.

The fundamental data structure that may determine the order of program execution may be called an event tree. In between reactions, the event tree data structure may be empty. It is a data structure that may grow monotonically during a reaction to eventually contain all events and co-events. The root of the event tree may be the external event. At the beginning of the reaction, in general, the even tree consists of the root only and the set of protected positions is empty. Every event may have two ordered sets of children called the pre-event queue and post-event queue. If both are empty the event is called a leaf. The reaction generally follows a process, called the event principle, that may be defined relative to an event, e, called the selected event. In general, the process may include:

determining the actual target l of e;
calculating a set of pre-events of e;
adding the pre-events as children of e, in general, these events are set to be raised to the pre-queue of e;
applying the event principle to each pre-event of e, where the set of protected positions is augmented, for the duration of the processing of the pre-events, with the upward closure of l;

if the actual target is defined and the event is consumable, executing e; during execution of an event, the current queue may be the post-events queue of e (events may be added through raise statements to the current queue during execution of e); and applying the event principle to each post-event of e.

Memory model. In accordance with an embodiment of the present invention, since all threads may be statically declared, the memory model may be relatively simple. For example, there may be a fixed tree of activation records, each corresponding to a block with allocated memory for local variables. The local variables may be pointers into a heap, where XML data may be allocated. In a XPath expression, a variable may be referred to using: "$-syntax". For example, a variable named x would be referred to as "$x".

In accordance with an embodiment of the present invention, a variety of new declarations and statements may be supported, including a variable declaration and an update, a states block, a thread block, a terminate, a raise, a signal, a handler and co-handler, and a common handler statements.

Variable declaration. In accordance with an embodiment of the present invention, variables may be declared in two syntax forms:

<var name="Name" select="Expr"/>;

and var name="Name">
Constructor
</var>

In the former, Expr is an XPath expression that may be evaluated with a focus set to the current event. In the latter, Constructor is an XML tree constructor.

Update statement. In accordance with an embodiment of the present invention, the update statement For example, the update statement may be expressed using either of the following syntaxes:

<update name="Name" select="Expr"/>;

and

<update name="Name">
Constructor
</update>

States block statement. In accordance with an embodiment of the present invention, the states block statement generally is the fundamental intra-thread control structure. Execution of a states block may suspend the containing thread after raising the init signal on the block. For example, the states block statement may use the following syntax:

<states id="name">
Declarations Handlers
</states>

The id attribute may be optional. The statements in the block statement may be executed in the same thread to which the block belongs. The handlers may also belong to this thread. Thus, if the program counter is inside the state block, then it points to a position either in a handler or it points to the block itself. If a handler contains the program counter, then this handler may be called the current handler. When a handler handles an event, the current handler, if it exists, may be exited according to the event principle.

Thread block statement. In accordance with an embodiment of the present invention, the thread block may create a subthread for each handler. Execution of a thread block may suspend the thread after the init signal is raised on the block. For example, the thread block statement may use the following syntax:

<threads>
Declarations Handlers
</threads>

Terminate statement. In accordance with an embodiment of the present invention, the terminate statement generally may terminate the closest enclosing block. For example, the terminate statement may use the following syntax:

<terminate/>

However, the terminate statement, generally, will not terminate the closest enclosing block if it is in the protected set, in which case the execution of the statement, generally, has no effect. Execution may continue for the thread that contains the block that was terminated and the program counter of that thread may be placed after the block.

Raise statement. In accordance with an embodiment of the present invention, the raise statement may be the general method of raising an event. For example, the raise statement may use the following syntax:

<raise target="Location" forwarding="Bool-Expr2" delay="Bool-Expr5" immediate="Bool-Expr4" consumable="Bool-Expr3" bubbles="Bool-Expr1">
Constructor
</raise>

The target may specify the block or thread to which the event is directed. If the value of forwarding is no, then the event may be raised at the target, either at the block designated or at the location of the program counter of the thread, if a thread is designated. Otherwise, when the value of the forwarding attribute is thread, it may be raised as if directed towards the thread. If the attribute bubbles is yes, then the event may be raised to each thread containing the thread of the target as if the forwarding attribute is thread with the event for the innermost thread being raised first. The forwarding attribute may not be allowed when the bubbles attribute is true. The consumable attribute may determine whether the event is consumable or a signal. In general, the event may be added to the end of the current queue, but if the value of the immediate attribute is true, then the event may be added to the beginning instead.

Signal statement. In accordance with an embodiment of the present invention, the signal statement in general, may be an abbreviation for a raise statement. For example, the signal statement in the following syntax:

<signal target="loc-Expr" immediate="Bool-Expr3" forwarding="Bool-Expr2" bubbles="Bool-Expr1">
Constructor
</signal> may be an abbreviation for the following raise statement:

<raise target="loc-Expr" forwarding ="Bool-Expr2" immediate="Bool-Expr3" consumable="false" bubbles="Bool-Expr1">
Constructor
</raise>

Handler and co-handler statement. In accordance with an embodiment of the present invention, the semantics of handler and co-handler statements are generally the same, except for the role that co-handler statements play in determining pre-. For example, the handler statement may use the following syntax:

<handler match="Expr">
Statements
</handler> and the co-handler statement may use the following syntax:

<co-handler match="Expr" loc="loc-Expr" delay="bool-Expr">

Statements
</co-handler>

Common Handlers. In accordance with an embodiment of the present invention, one common handler, an on-init handler may be used to resume execution immediately after the program counter has reached a states block. It may also be used to start subthreads in a thread block immediately after the program counter has reached the thread block. In both cases, it may still be possible that other threads suspended at prior locations, according to document order, may be resumed beforehand when they observe the init event of the block. For example, the on-init handler statement may use the following syntax:

<on-init match="loc-Expr">
Statements
</on-init>

For example, the default value of Expr may be ancestor::*/states|threads[1], that is, the default value may select the closest enclosing states or threads element. In general, this handler may be an abbreviation for:

co-handler loc="loc-Expr" match="UPL:init">
Statements
</co-handler>

The construct:
<init loc="loc-Expr"/> may raise the predefined init event as a signal to the locations in loc-Expr. For example:

<signal immediate="true" loc="loc-Expr" forwarding="none">
UPL:init
</signal>

The construct:
<exit loc="loc-Expr"/> may raise the predefined exit event as a signal to the loc-Expr. In general, the default value of loc-Expr is ancestor::*/states|threads[1]. For example:

<signal immediate="true" loc="Expr" forwarding="none">
UPL:exit
</signal>

The exit handler specifies the code that is to be executed right before a block is exited. For example:
<on-exit>Statements</on-exit>

If a block has no exit handler, then such a handler, containing no statements, may be presumed to be present. Consequently, the effect of signaling the exit event to a block or thread-block is to terminate that block immediately, unless the exit handler contains statements that are suspended. The meaning of the on-exit handler is:

<co-handler match="UPL:exit">
<handler>
Statements
</handler>
<terminate/>
</co-handler>

A timeout handler may be specified as
<timeout delay="t" hard="Boot-Expr">
Statements
</timeout>

This handler may cause the UPL program issue a <timeout /> event, regarded as an external event, t seconds after the block in which the handler is declared starts executing. In this interval, the timeout handler may be said to be active and it may be said to be associated with a timer. If several <timeout /> events are to be issued at the same time, then one may be issued at time and only after the reaction of the preceding one has ended. The ordering of the events may be made to be consistent with the document order of the program. The attribute hard is optional and it may have a value of false. If the value of this attribute is true, then the remaining time may not be affected by undo or seek operations. Thus, in the normal case of a soft timeout, the timer may be decremented according to the advancement of presentation time. But in the case of a hard timeout, the time may be decremented according to the advancement of wall-clock time.

If statement. In accordance with an embodiment of the present invention, UPL may offer conventional sequential control structures. For example, <if test="Expr">
Statements
</if>
<if test="Expr">
<then>
Statements
</then>
<else>
Statements
</else>
</if>

The choose statement selects the first when element for execution whose expression evaluates to true.

<choose>
<when test="Expr">
Statements
</when>
. . .
</choose>

Objects. In accordance with an embodiment of the present invention, in UPL a mechanism for binding UPL scripting to another programming language may be through the use of an object element. For example, <object id="Object-ID" namespace="Nspace" timed="Bool-Expr" href="URL">
<param name="Pname1"> . . . </param>
<start method="Mname-start">
Start-Constr
</start>
<stop method="Mname-stop">
stop-Constr
</stop>
pause method="Mname-pause">
pause-Constr
</pause>
<resume method="Mname-resume">
resume-Constr
</resume>
<seek max="Float-Expr" method="Mname-seek">
seek-Constr
</seek>
</object>

The use of this element is essentially similar to the way objects are used in HTML. The href may be the location of object code. The Nspace may be the name of the namespace that is associated with values sent to the object by the UPL program via calls or values sent by the object to the UPL program via callbacks. Additionally, there may be a number of parameters. In the example above, one parameter named Pname1 is shown, which may be presented to the object went it is initialized. The object may be initialized whenever it is executed and the object may be removed as soon as the program counter leaves the handler containing the object.

If the value of the optional attribute timed is true, then UPL may regard the object as a media element that is presented in real-time. In particular, the object must exhibit various methods for controlling the presentation. These are specified by the elements start, stop, pause, resume, and seek. These elements must all be present when the timed attribute has the value true. They may not be present in any other case. When present, the Mname-seek is a function that may seek the timeline of the object, which is assumed to be a presentation or animation or other time-dependent activity. The function will be called by the undo mechanism with an argument that may be Seek-Constr concatenated with an element <time>t</time>, where t is a floating point number that may represent the presentation time in seconds since the execution of the call statement. The value of t is at most Float-Expr if the optional attribute max is provided. Usually, max is set to the length of the presentation. The other control elements may be defined analogously. They enable the UPL program to keep objects in synchronization with its own time tracking, which is affected by undo and seek operations issued by the user.

Call. In accordance with an embodiment of the present invention, a method of an object may be invoked through the following syntax:

```
<call recover-category="Name" idref="Object-ID" seek-
    time="Float-Expr" time-track="Track-Expr">
  <do method="Mname-do">
    Do-Constr
  </do>
  <undo method="Mname-undo">
    Undo-Constr
  </undo>
</call>
```

The value Mname-do is the name of the method to be invoked, and Do-Constr is a XML document that may represent the values of the arguments to the method. The marshaling of the XML document into values of the underlying scripting language is not described here, since it will be dependent on the programming language in which the object is implemented.

The undo element may specify in a similar way the method and arguments to be used when the method call is undone.

The time-track attribute, if present, may inform the UPL program that an operation affecting the presentation of the object may be carried out. If the time-track attribute is provided with the value seek-time, then the seek-time attribute must be present (and it is not allowed in any other case).

If the value of the optional seek-time attribute is provided, then the object may be assumed to be rendering a presentation and the call may be assumed to change the presentation time. This attribute allows the UPL program and the object to maintain the same notion of time.

Recover Statement. In accordance with an embodiment of the present invention, as an alternative to providing explicit undo methods, the recover statement may stipulate that the way to re-establish the effect of a category of method calls is to simply re-execute the last such call. For example, a method that specifies a complete speech recognition grammar satisfies this property. During the undoing of program execution, there may be then no need to explicitly undo each specification and retraction of a complete grammar. For example,

```
<recover recover-category="Name">
  Statements
</recover>
```

Callback handler. In accordance with an embodiment of the present invention, an embedded object is able to issue calls to the UPL program. To enable such callbacks, the UPL program declares a special handler:

```
<callback name="Name" idref="Object-ID">
  Statements
</callback>
```

It may specify that callbacks to a method named Name may be issued by the object. The arguments of the methods may be marshaled into XML, again by a method that is not described here; this content becomes children of an XML document, whose top-node is labeled Name using the namespace of the object. The XML document may then be raised as an external event at the location of the callback element. It may be an error if there is more than one such element for a given object and Name.

Checkpoint. In accordance with an embodiment of the present invention, the checkpoint statement:

```
<checkpoint/>
``` may cause the full program state at the time of encountering the checkpoint statement to be saved and is described in the following paragraphs.

Checkpointing, Seeking and Undoing. In accordance with an embodiment of the present invention, in general, UPL maintains a wall-clock that records the amount of seconds that have passed since the beginning of the execution of the program. It may be possible to skip forward and to skip backward in a program through an operation called seeking. For example, if no events have passed during 10 seconds that have passed since an audio recording was initiated, then it may be possible to rewind the rendering by the amount of say eight seconds, without changing the value of any program variables or program counters. In this case, the presentation time may be referred to as being decremented by eight seconds. Generally the presentation time advances at the same rate as the wall-clock; the only exceptions are when the program is seeked in a forwards or backwards direction. In those cases, the presentation time may be decremented or implemented by a delta seek, which is the relative amount of time that the presentation, that is, the program execution, is subjected to.

Moreover, some objects may be time-tracked. When a call containing a start attribute to that object is executed, time-tracking may be initiated and the delta time of the object is set to 0. The delta time then progresses at the same rate as the wall-clock. When a call containing the pause attribute is executed, time-tracking may be suspended for the object. When a call containing the resume attribute is executed, time-tracking may be resumed. And, when a call containing a seek-time attribute is executed, the delta time of the object may be set to the value of the attribute. When a call a containing the stop attribute is executed, the object may no longer be time-tracked.

To enable recovery, UPL generally maintains a log of the last n_max external events and associated reactions that occurred. The number n_max may be implementation dependent. Additionally, the global state of the program may be recorded for each recorded reaction. The state may be recorded right before the reaction. The presentation time at the time of the reaction may be recorded. The global state may be augmented with information about the objects that are time-tracked at the time of the reaction along with their delta times. Moreover, the sequence of call statements executed during the reaction may be stored. Finally, for each valid recover statement at the beginning of the reaction, the last call with the appropriate recover-category may be memorized.

Undo. In accordance with an embodiment of the present invention, any statement in UPL may disallow an undo operation through the use of the optional undo attribute. If the undo attribute is false, then the reaction in which the statement is executed may not be undoable.

Recovery by undo may back up the computation to the last reaction for which a checkpoint statement was executed. Recovery may not be possible if this reaction or a later reaction is not undoable.

In general, the computation may be backed up to a reaction r by undoing one reaction at time, starting with the last reaction that occurred and proceeding until and but not including r.

A reaction may be undone, in general, as follows. First, the sequence of call statements executed may be examined in reverse order. Second, for each such statement that contains an undo element, the corresponding method may be invoked on the appropriate object. Third, the global state recorded may be restored.

Moreover, for each object that is time-tracked after the preceding reaction, a call of the provided seek method may be issued with the value of the delta time recorded for the reaction.

Finally, for each recover statement with category C that contains a program counter, the last executed call statement of category C may be recorded by the reaction that is re-executed.

Redo. In accordance with an embodiment of the present invention, according to the conventional script model of undoing and redoing, it may be possible to apply a redo operation following an undo operation in order to cancel the effect of the latter. To accomplish this effect, the UPL program re-executes the reactions corresponding to the events that were undone.

Local seek after last reaction. In accordance with an embodiment of the present invention, a seek to a time before any scheduled timeouts, but to a time after the last reaction, is called a local seek. Let the seeked presentation time be the current presentation time plus the seek delta. The program state may not be altered but the presentation time is altered, negatively or positively, according to the seek delta. The maximum seek delta may be equal to the minimum of the remaining time of active timeout handlers. The minimum seek delta may be equal to the difference between the presentation time and the presentation time of the last reaction. As stated above, the seek operation may not affect the global state. All objects that are time-tracked are issued a call according to their respective seek element with a time parameter that is the sum of their delta time and the seek delta. Also, the remaining time of all soft timeout handlers may be decremented by the seek delta.

Global seek backwards. In accordance with an embodiment of the present invention, if the seeked presentation time is earlier than the presentation time of the last reaction, then the seek operation may be accompanied by undo operations up to the last reaction r with a presentation time that is less or equal to the seek time. The seek operation may now be performed from r with a delta of the difference between the seeked presentation time and the presentation time of r. The combined operation is called a global backwards seek.

Global seek forwards. In accordance with an embodiment of the present invention, it may also be possible to seek forwards in time beyond the time of an active timeout handler. This may be accomplished by executing the timeout events that lie between the current presentation time and the seeked presentation time. The difference between the seeked presentation time and the last such time may then be the delta of a local seek that is carried out after the timeout reactions. In this way, the effect of redos and local seeks may be combined to enable forward time seek.

The following example shows how UPL may emulate the semantics of a media element in SMIL. The element to be emulated by a UPL block is:

<vtts>Hi? I am Crhstal.</vtts> and, which must have the following properties:

It allows a beginElement method, which will be expressed as an ability to handle a beginElement event delivered to the Visual Text To Speech (VTTS) media element UPL block. The beginElement method begins the element in the sense of initiating its playing. If it is currently being played, then it will be restarted.

Similarly, it allows a endElement method that ends the playing of the element.

Whenever the element is begun, the begin event is signaled to the VTTS element.

Whenever the element is ended, the end event is signaled to the VTTS element.

```
<threads ID="VTTS">
    <var name="active"select="false"/>
    <on-init>
        <object id="vtts"namespace="v"timed="true"href=". . . ">
            <param name="text">
                Hi! I am Crystal.
            </param>
            <start method="start"/>
            <stop method="stop"/>
            <pause method="pause"/>
            <resume method="resume"/>
            <seek max="5"method="seek"/>
        </object>
    </on-init>
    <handler event="beginElement">
        <if test="$active">
            <then>
                <call method="pause"idref="vtts"time-track="pause"/>
                <call method="seek_to"idref="vtts"seek-time="0"
                    time-track="seek"><time>0</time>
                </call>
                <call method="start"idref="vtts"time-track="start"/>
                <signal target="crystal">end</signal>
            </then>
            <else>
                <call method="start"idref="vtts"time-track="start"/>
            </else>
        </if>
        <update name="active"select="true"/>
        <signal target="crystal">begin</signal>
    </handler>
    <handler event="end">
        <if test="$active">
            <then>
                <call method="pause"idref="vtts"time-track="pause"/>
                <signal target="crystal">end</signal>
            </then>
        </if>
        <update name="active"select="false"/>
    </handler>
    <handler event="seek">
        <call method="seek"idref="vtts"seek-time="
"time-track="seek">
            <v:seek><value-of select="time"/></v:seek>
```

```
        </call>
      </handler>
</threads>
```

It should be noted that the SMIL mechanism of event synchronization may be easily emulated in UPL. For example, in SMIL a programmer may specify that an audio recording is to begin whenever the VTTS block is begun:

<audio id="AUDIO" begin="VTTS.begin"/>

In accordance with an embodiment of the present invention, in UPL, a handler may be added to the representation of the audio element that is notified of the beginning of the VTTS element upon which it raises the beginElement event to its own block:

```
<threads id="AUDIO">
    <handler event="begin" co="VTTS">
        <raise target="AUDIO">
            <beginElement/>
        </raise>
    </handler>
    . . .
    <handler event="beginElement">
        . . .
    </handler>
</threads>
```

Relation to SMIL. SMIL offers a programming mechanism that substantially simplifies synchronization by implementing the ability to react to events dispatched anywhere. This kind of event response is well-known from the class of synchronous reactive languages. The paradigm is that events may not be directed towards any target and are not consumed by event handlers. Instead, events may be globally visible, and, at each instant, a number of such events may be present in the "event ether."

SMIL 2.0 has implemented a conventional concept of an event. Specifically, an event is dispatched by a thread on (to) a target, which is a block or thread. Events may be handled in the classical manner, for example, by listeners or handlers. However, SMIL 2.0 introduces a complementary mechanism: an event-value, which is identified by the event type and the ID of the target, where the event is raised. The event-value provides a way for a thread to wake up or to terminate. The activation of this mechanism is called "responding to an event" or "delivery of an event notification" in SMIL 2.0. For example, the attribute begin='foo.begin' can be used to delay the activation of a block until the begin event has been dispatched on the block named foo. For example, the Document Object Model (DOM) concept that an event is dispatched is called "is raised", "is fired", "has occurred", or "has happened" in SMIL 2.0.

In SMIL 2.0, the mechanism of event-values, and the related mechanism of sync-values, are treated semantically as part of the dynamic building of a time graph constructed dynamically as the programs running. Unfortunately, these mechanisms are very complicated and contain several seemingly ad hoc exceptions. Moreover, the semantics are not tied precisely together with that of the dispatching of events, for example, in the same instant, awakening by observation may trigger further events to be raised through scripting, which in turn may awake further threads through observation. Thus, there seems to be some implicit ordering of operational steps—but this phenomenon contradicts the point-like nature of time and synchronization semantics the interaction between the activation of blocks determined by this graph and the general interface to events that is also a part of SMIL is complicated.

In contrast, UPL may take the view that these event-values and sync-values should be events, or rather co-events. These "inverse" events may be generated by need, for example, a co-event may be raised to a co-handler only when an event is selected for execution that matches the event specification of the co-handler. In this way, UPL may systematically describe temporal relationships along timed threads.

Similarly, the event and history oriented view of the UPL language implies that a built-in recovery mechanism founded on both conventional checkpointing and time seeking may be possible within one framework. In addition, the language may be integrated with a conventional scripting language, even preserving undoability whenever the programmer provides explicit recipes for recovery.

Example of how UPL overcomes deficiencies in SMIL. In the program fragment below, SMIL is combined with HTML to specify a simple multimedia presentation with user controls. This combination is done according to the implementation of SMIL in Microsoft Internet Explorer 6 as distributed from www.microsoft.com as of the spring of 2002. The SMIL elements are prefixed "SMIL:", whereas the HTML elements button (which renders a button on the screen), span (which renders text), and video (which renders a video clip) do not have a prefix. The SMIL:seq element with a repeatCount attribute specifies that the two containing elements, named button and SMIL:par, are to be executed in sequence, and this sequence is to be continued indefinitely. The button element is turned into a timed elements through the class="time" declaration. The element is specified to end on the event c.click, which specifies a mouse click on the element named c, the button element itself. Thus, while the button has not yet been pressed, execution inside the SMIL:seq element is suspended in the button element. On a button press, execution continues in the SMIL:par element. This element, named example, specifies that three parallel activities or threads are executed: the span element specifies that the text "Launching!" is be rendered, the SMIL:video element specifies that the video file "spaceshuttle.avi" is rendered, and the SMIL:seq element specifies that a control thread is executed. The control thread starts executing when the rewind button (defined elsewhere) is clicked, for example, as a result the rewind function for seeking in the SMIL document is called on the parallel element named example. This function, which is not shown here, invokes the built-in seek semantics of SMIL, where the time seeked is the presentation time minus three seconds.

SMIL semantics are declarative and no history of events is maintained. The semantics stipulate that when an element is seeked, the parent of the element is also seeked. Unfortunately, since no history about actually occurring events is recorded, the seek of the parent element, which in this case is the outer SMIL:seq element, results in the re-execution of the button element. The semantics of SMIL does not assume that the c.click event ever happened. Thus, the resulting state after the seeked is inconsistent: both children of the SMIL:seq element are executed at the same time, something that should be impossible according to a sequential semantics.

```
<SMIL:seq repeatCount="indefinite">
    <button id="c" end="c.click" class="time">
        Clock to launch!
```

```
    </button>
    <SMIL:par id="example" end="clip.click">
        <span class="time">
            Launching!
        </span>
        <SMIL:video id="clip" src="spaceshuttle.avi">
            <SMIL:animate attributeName="mute" to="true"
                begin="10s" dur="5"/>
        </SMIL:video>
        <SMIL:seq onend="rewind(example;" dur="0"
            begin="rewind.click"/>
    </SMIL:par>
</SMIL:seq>
```

In accordance with an embodiment of the present invention, the above program may be written in UPL as follows:

```
UPL:seq repeatCount="indefinite"
    <checkpoint/>
    <button id="c" end="c.click" class="time">
        Click to launch!
    </button>
    <checkpoint/>
    <UPL:par id="example" end="clip.click">
        <span class="time">
            Launching!
        </span>
        <UPL:video id="clip" src="spaceshuttle.avi">
            <UPL:animate attributeName="mute" to="rue"
                begin="10s" dur="5"/>
        </UPL:video>
        <UPL:seq onend="rewind(example);" dur="0"
            begin="rewind.click"/>
    </UPL:par>
</UPL:seq>
```

The above examples have assumed that elements UPL:seq, UPL:par, etc. have been formulated in terms of the UPL core language to mimic the semantics of the corresponding SMIL elements.

Since UPL semantics may be based on recording the history of events, the UPL program example above correctly rewinds the video without re-executing the button element. This functionality may be independent of the <checkpoint/> elements that have been inserted.

In addition to the seek mechanism, the UPL program may offer an undo facility. For example, if the undo button is pressed during a video presentation, then the state of the UPL program may be made to be the one existing right after the last checkpoint was encountered. Therefore, the effect may be that the video presentation is seeked to the beginning. If two undoes are presented in a row, then the UPL program may be brought back to the state that existed after the first checkpoint was encountered. That is, in the example above, the button will be shown again, and the video will not be playing.

A button interface to the runtime of UPL. The discussion of forward and backwards seek, along with the undo and redo mechanisms, clearly points to a user interface for UPL programs that is almost identical to that of CD or tape players. For example, the interface may be arranged as: "|<", "<<", ">>", ">|" and "pause/play", where the button marked "|<" may represent the undo function, the button marked "<<" may represent the rewind function, the button ">>" may represent the forward function, and the button ">|" may represent the redo function. More precisely, a press on the redo button not followed by another press within a specified key timeout may invoke the undo mechanism of the UPL language to the last checkpointed reaction. A number, n, of keystrokes, each within the key timeout of the previous one, may invoke the undo mechanism to the nth last checkpoint. The redo button may be provided with similar semantics according to the key timeout, and it is linked to the redo semantics described earlier. For the rewind and forward buttons, each key press may be associated with a fixed key delta time. If the either button is pressed n times, then the presentation may be seeked to a total delta of n times the key delta time.

The pause button may invoke the "pause" (or "resume") function specified in UPL calls, while the presentation time is paused (or resumed).

It should, of course, be understood that while the present invention has been described mainly in terms of a general-purpose undoable programming language having separate undoable language and conventional language portions, those skilled in the art will recognize that the principles of the invention, as discussed herein, may be used advantageously with alternative embodiments involving other programming language constructs. Accordingly, all such implementations, which fall within the spirit and scope of the appended claims, will be embraced by the principles of the present invention.

What is claimed is:

1. A method comprising:
   determining an actual target of an event in a fully undoable program;
   calculating a set of pre-events of said event;
   adding said set of pre-events as children of said event, said set of pre-events to be raised to a pre-queue of said event;
   applying an event principle to each pre-event of said event such that a set of protected positions are augmented with an upward closure of said actual target;
   executing said event, if said actual target is defined and said event is consumable; and
   applying said event principle to each post-event of said event.

2. The method of claim 1 wherein determining an actual target of an event in a fully undoable program comprises:
   locating an innermost block containing said actual target; and
   setting said actual target equal to undefined, if said innermost block is a protected program position.

3. The method of claim 2 further comprising:
   evaluating an event expression of a first handler of said innermost block; and
   setting said actual target equal to said innermost block, if said event expression of said first handler of said innermost block evaluates to true.

4. The method of claim 3 further comprising:
   evaluating an event expression of a subsequent handler of said innermost block; and
   setting said actual target equal to said innermost block, if said event expression of said subsequent handler of said innermost block evaluates to true.

5. The method of claim 3 further comprising:
   evaluating an event expression for each subsequent handler of said innermost block until said event expression evaluates to true or no subsequent handlers of said innermost block remain;
   setting said actual target equal to said innermost block, if said event expression of said subsequent handler of said innermost block evaluates to true;
   setting said actual target equal to undefined, if said next-innermost block is a protected program position; and evaluating an event expression for each handler of a next-innermost block enclosing said innermost block until said event expression evaluates to true or no subsequent handlers of said next-innermost block rmain.

6. The method of claim 1 wherein determining an actual target of an event comprises:
calculating an intended target of said event including:
setting the intended target equal to the actual target, if the event is not forwarded and a program counter of a thread containing the actual target is at the actual target;
setting the intended target equal to the actual target, if the event is not forwarded and a program counter of a thread containing the actual target is inside the actual target;
setting the intended target equal to undefined, if the event is not at the actual target; and
setting the intended target equal to undefined, if the event is not inside the actual target.

7. The method of claim 1 wherein determining an actual target of an event comprises:
calculating an intended target of said event including:
setting the intended target equal to a program counter location upon the event eing forwarded, if the program counter is defined; and
setting the intended target equal to undefined, if the program counter is undefined.

8. A computer system for generating and executing fully seekable programs, said computer system comprising:
an event driven, thread-based scripting language component including a grammar having a syntax for each of a plurality of fully seekable instructions, the syntax having a marker mechanism to enable recovery to at least one of a plurality of predetermined execution states, the syntax further comprising a plurality of handler statements, a recover statement, a checkpoint statement, an undo statement, a redo statement and a plurality of seek statements;
a programming language component including a grammar having a syntax for each of a plurality of general programming instructions, said programming language grammar being adapted to receive program calls from the plurality of fully seekable instructions, send program calls to the plurality of fully seekable instructions and receive an input command;
a seek runtime component in communication with a fully seekable core programming language component and said programming language component, the seek runtime component being adapted to move the execution of a program written in said fully seekable core programming language to one of the plurality of predetermined execution states upon receipt of the input command; and
at least one user input component coupled to at least one of said programming language component and said seek runtime component, the at least one user input component being adapted to forward the input command to said programming language component and said seek runtime component.

9. The computer system of claim 8, wherein said plurality of handler statements comprises:
a handler statement;
a co-handler statement; and
a common handler statement including:
an on-init handler statement;
an exit handler statement; and
a timeout handler statement.

10. The computer system of claim 8, wherein said plurality of seek statements comprises:
a local seek after last reaction statement;
a global seek backwards statement; and
a global seek forwards statement.

11. The computer system of claim 8, wherein said event driven, thread-based scripting language grammar syntax further comprises:
a raise statement.

12. The computer system of claim 8 wherein said event driven, thread-based scripting language component further comprises:
an event tree data structure to control the order of execution of a program written in said event driven, thread-based scripting language.

13. The computer system of claim 12 wherein said event tree data structure is empty, if no reaction from the program written in said event driven, thread-based scripting language is executing.

14. The computer system of claim 13 wherein said root comprises an external event.

15. The computer system of claim 12 wherein said event tree data structure grows monotonically to contain all events in a reaction from the program written in said event driven, thread-based scripting language are executing.

16. The computer system of claim 12 wherein said event tree data structure comprises a root.

17. The computer system of claim 12 wherein said event tree data structure comprises a root and at least one event.

18. The computer sytem of claim 17 wherein said at least one event comprises:
an ordered set of pre-events; and
an ordered set of post-events.

19. The computer system of claim 8 wherein a program written using said event driven, thread-based scripting language executes in response to a event.

20. The computer system of claim 19 wherein a program written using said event driven, thread-based scripting language executes a single thread at a time.

21. A processing system comprising:
a processor;
a memory coupled to the processor;
a fully undoable, executable program stored in the memory, the fully undoable program to completely recover to at least one prior execution state in response to a recovery request;
said fully undoable program being configured to save a current program state upon encountering an instruction associated with a recovery marker;
said fully undoable program being further configured to return to the saved program state upon receipt of the recovery request and continue execution from the returned to program state; and
said fully undoable program being further configured to determine an actual target of said event, calculate a set of pre-events of said event, add said set of pre-events as children of said event, said set of pre-events being set to be raised to a pre-queue of said event, apply an event principle to each pre-event of said event such that a set of protected positions being augmented with an upward closure of said tartet, execute said event, if said actual target is defined and said event is consumable and apply said event principle to each post-event of said event.

22. The processing sytem of claim 21 wherein said fully undoable program is written using an event driven, thread-based scripting language.

23. The processing system of claim 22 wherein said fully undoable program executes a single thread at a time.

24. The processing system of claim 22 wherein said fully undoable program executes in response to an event.

25. A computer-readable medium having stored thereon a plurality of executable instructions to control a computing device, the instructions comprising:
determining an actual target of an event in a fully undoable program;
calculating a set of pre-events of said event;
applying an event principle to each pre-event of said event such that a set of protected positions are augmented with an upward closure of said actual target;
executing said event, if said actual target is defined and said event is consumable; and
applying said event principle to each post-event of said event.

26. The computer-readable medium of claim 25, wherein determining an actual target of an event in a fully undoable program comprises:
locating an innermost block containing said actual target; and
setting said actual target equal to undefined, if said innermost block is a protected program position.

27. The computer-readable medium of claim 26, the instructions further comprising:
evaluating an event expression of a first handler of said innermost block; and
setting said actual target equal to said innermost block, if said event expression of said first handler of said innermost block evaluates to true.

28. The computer-readable medium of claim 27, the instructions further comprising:
evaluating an event expression of a subsequent handler of said innermost block; and
setting said actual target equal to said innermost block, if said event expression of said subsequent handler of said innermost block evaluates to true.

29. The computer-readable medium of claim 27, the instructions further comprising:
evaluating an event expression for each subsequent handler of said innermost block until said event expression evaluates to true or no subsequent handlers of said innermost block remain;
setting said actual target equal to said innermost block, if said event expression of said subsequent handler of said innermost block evaluates to true;
setting said actual target equal to undefined, if said next-innermost block is a protected program position; and
evaluating an event expression for each handler of a next-innermost block enclosing said innermost block until said event expression evaluates to true or no subsequent handlers of said next-innermost block remain.

30. The computer-readable medium of claim 25, wherein determining an actual target of an event comprises:
calculating an intended target of said event including:
setting the intended target equal to the actual target, if the event is not forwarded and a program counter of a thread containing the actual target is inside the actual target;
setting the intended target equal to the actual target, if the event is not forwarded and a program counter of a thread containing the actual target is inside the actual target;
setting the intended target equal to undefined, if the event is not at the actual target; and
setting the intended target equal to undefined, if the event is not inside the actual target.

31. The computer-readable medium of claim 25, wherein determining an actual target of an event comprises:
calculating an intended target of said event including:
setting the intended target equal to a program counter location upon the event being forwarded, if the program counter is defined; and
setting the intended target equal to undefined, if the program counter is undefined.

32. The computer-readable medium of claim 25, the instructions further comprising:
calculating a set of co-event pairs, each said co-event pair to include a co-event and a co-handler of the co-event.

* * * * *